(12) United States Patent  (10) Patent No.: US 8,172,519 B2
Jarrabet et al.  (45) Date of Patent: May 8, 2012

(54) ABRADABLE SEALS

(75) Inventors: Gregory Paul Jarrabet, Ballston Lake, NY (US); Joshua Lee Margolies, Niskayuna, NY (US); Warren Arthur Nelson, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 471 days.

(21) Appl. No.: 12/436,662

(22) Filed: May 6, 2009

(65) Prior Publication Data

US 2010/0284797 A1  Nov. 11, 2010

(51) Int. Cl.
- F01D 5/00 (2006.01)
- F01D 9/00 (2006.01)
- F01D 25/16 (2006.01)
- F04D 29/18 (2006.01)

(52) U.S. Cl. ............... 415/174.4; 415/173.4; 415/173.5; 415/203; 428/304.4; 428/701; 428/702

(58) Field of Classification Search ............... 415/173.3, 415/173.4, 173.5, 173.6, 174.2, 174.4, 174.5, 415/196, 197, 230, 231; 428/701, 702
See application file for complete search history.

(56) References Cited

U.S. PATENT DOCUMENTS

| | | | |
|---|---|---|---|
| 3,575,427 | A | 4/1971 | Lapac |
| 4,460,185 | A | 7/1984 | Grandey |
| 4,481,237 | A | 11/1984 | Bosshart et al. |
| 4,767,267 | A | 8/1988 | Salt et al. |
| 4,936,745 | A | 6/1990 | Vine et al. |
| 5,476,363 | A | 12/1995 | Freling et al. |
| 5,536,022 | A | 7/1996 | Sileo et al. |
| 6,258,467 | B1 * | 7/2001 | Subramanian ............... 428/633 |
| 6,340,286 | B1 | 1/2002 | Aksit et al. |
| 6,352,264 | B1 | 3/2002 | Dalzell, Jr. et al. |
| 6,365,236 | B1 | 4/2002 | Maloney |
| 6,365,274 | B1 | 4/2002 | Scheckenbach et al. |
| 6,533,285 | B2 | 3/2003 | Nava et al. |
| 6,547,522 | B2 | 4/2003 | Turnquist et al. |
| 6,808,756 | B2 | 10/2004 | Hajmrle et al. |
| 6,946,208 | B2 * | 9/2005 | Subramanian et al. ....... 428/701 |
| 6,977,060 | B1 | 12/2005 | Merrill et al. |
| 7,001,145 | B2 | 2/2006 | Couture et al. |
| 7,008,462 | B2 | 3/2006 | Fiala et al. |
| 7,160,352 | B2 | 1/2007 | Le Biez et al. |
| 7,179,507 | B2 | 2/2007 | Fiala et al. |
| 7,198,462 | B2 | 4/2007 | Merrill et al. |
| 7,267,889 | B2 | 9/2007 | Hajmrle et al. |
| 7,287,956 | B2 | 10/2007 | Bracken et al. |

* cited by examiner

*Primary Examiner* — David Nhu
(74) *Attorney, Agent, or Firm* — Fletcher Yoder

(57) ABSTRACT

In one embodiment, an abradable seal includes a soft material that may be worn away and a hard material that may provide mechanical strength for the abradable seal. The soft material and the hard material may include different compositions of a base material.

19 Claims, 4 Drawing Sheets

ABRADABLE SEALS

BACKGROUND OF THE INVENTION

The subject matter disclosed herein relates to abradable seals, and more specifically, to abradable seals employed in rotary machines. The rotary machines may generate power by using a fluid to rotate blades within a stationary shroud.

In general, abradable seals may be employed between rotating and stationary parts in rotary machines, such as gas turbines, steam turbines, generators, and compressors. Abradable seals may be located between the blades and the shroud to reduce or eliminate leakage of the fluid between the blades and the shroud, which in turn may improve the efficiency of the rotary machine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a seal disposed between moving and stationary components. The seal includes a multi-phase composition with a matrix that has a first material having a first crystalline phase of a base material and a second material having a second crystalline phase of the base material suspended in the matrix. The first and second crystalline phases are different from one another.

In a second embodiment, a system includes an abradable, substantially non-porous seal. The seal includes a ceramic matrix composition that has a hard ceramic having a first crystalline phase of a base ceramic with a first percentage of a stabilizer, and a soft ceramic having a second crystalline phase of the base ceramic with a second percentage of the stabilizer. The first and second percentages are different from one another.

In a third embodiment, a system includes a soft material having a first crystal phase configured to be worn away and a hard material having a second crystal phase configured to provide mechanical strength for an abradable seal that includes the soft material and the hard material. The soft material and the hard material each include different compositions of a base material and an additive.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

1. Introduction

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to abradable seals for rotary machines. Rather than intentionally introducing porosity into the seal materials, for example, by using a fugitive material, the abradable seals described herein may include a mechanically soft phase incorporated into a matrix of a harder phase material. The hard and soft phase materials may have different crystal systems and/or lattice structures, resulting in different hardness. The hard and soft phase materials may generally be produced by incorporating different amounts of an additive into the same or similar base material to produce different crystalline phases. Specifically, as used herein, the term "phase" refers to an interchangeable crystal system and/or lattice structure of a material. The additive may be an element, mixture of elements, and/or a constituent, and the base material may be a ceramic, metal, and/or an alloy.

Figure 1:
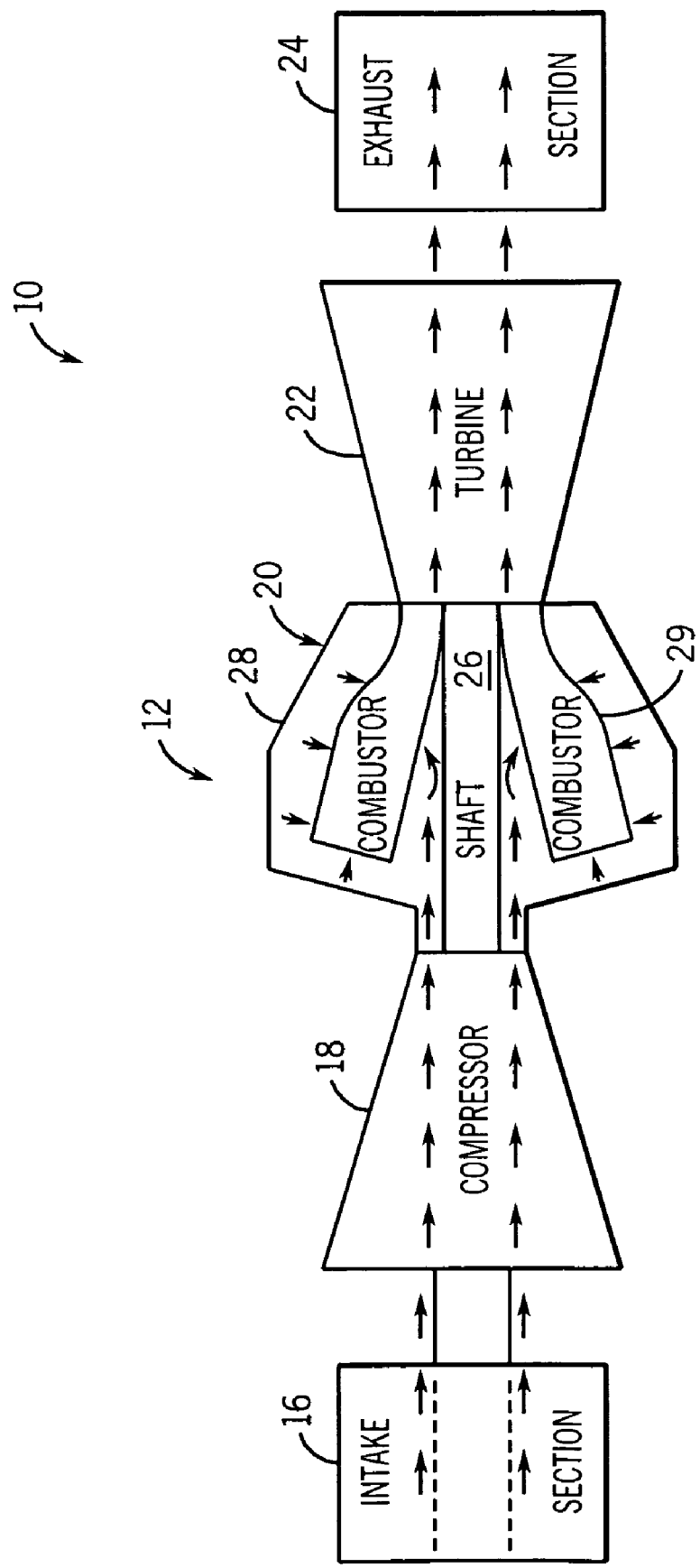
FIG. 1 is a schematic flow diagram of an embodiment of a gas turbine engine that may employ abradable seals.

In general, the abradable seals may be employed within a range of rotary machines, such as gas turbines, steam turbines, generators, and compressors. FIG. 1 illustrates an exemplary system 10 including a gas turbine engine 12 that may employ abradable seals. In certain embodiments, the system 10 may include an aircraft, a watercraft, a locomotive, a power generation system, or combinations thereof. The illustrated gas turbine engine 12 includes an air intake section 16, a compressor 18, a combustor section 20, a turbine 22, and an exhaust section 24. The turbine 22 is coupled to the compressor 18 via a shaft 26.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine 22. The compressed air from the compressor 18 enters combustors 29 where the compressed air may mix and combust with fuel within the combustors 29 to drive the turbine 22.

From the combustor section 20, the hot combustion gases flow through the turbine 22, driving the compressor 18 via the shaft 26. For example, the combustion gases may apply motive forces to turbine rotor blades within the turbine 22 to rotate the shaft 26. After flowing through the turbine 22, the hot combustion gases may exit the gas turbine engine 12 through the exhaust section 24.

Figure 2:
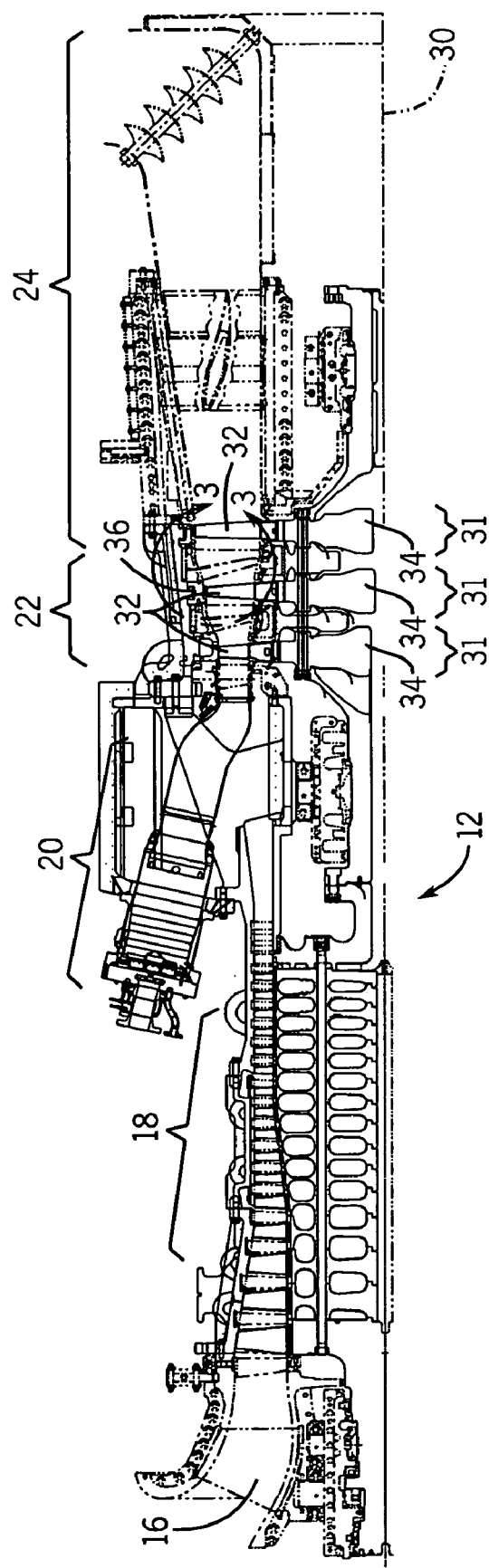
FIG. 2 is a sectional view of the gas turbine engine of FIG. 1 sectioned through the longitudinal axis.

FIG. 2 is a side view of an embodiment of the gas turbine engine 12 of FIG. 1 taken along the longitudinal axis 30. As depicted, the gas turbine 22 includes three separate stages 31. Each stage 31 may include a set of blades 32 coupled to a rotor wheel 34 that may be rotatably attached to the shaft 26 (FIG. 1). The blades 32 may extend radially outward from the rotor wheels 34 towards a shroud 36. Abradable seals may be located between the blades 32 and the shroud 36 to impede flow of hot combustion gases between the shroud 36 and the blades 32. Abradable seals also may be located between the turbine stages 31 to form interstage seals.

Although the gas turbine 22 is illustrated as a three-stage turbine, the seal structures described herein may be employed in any suitable type of turbine with any number of stages and shafts. For example, the seal structures may be included in a single stage gas turbine, in a dual turbine system that includes a low-pressure turbine and a high-pressure turbine, or in a steam turbine. Further, the seal structures described herein may also be employed in a rotary compressor, such as the compressor 18.

Figure 3:
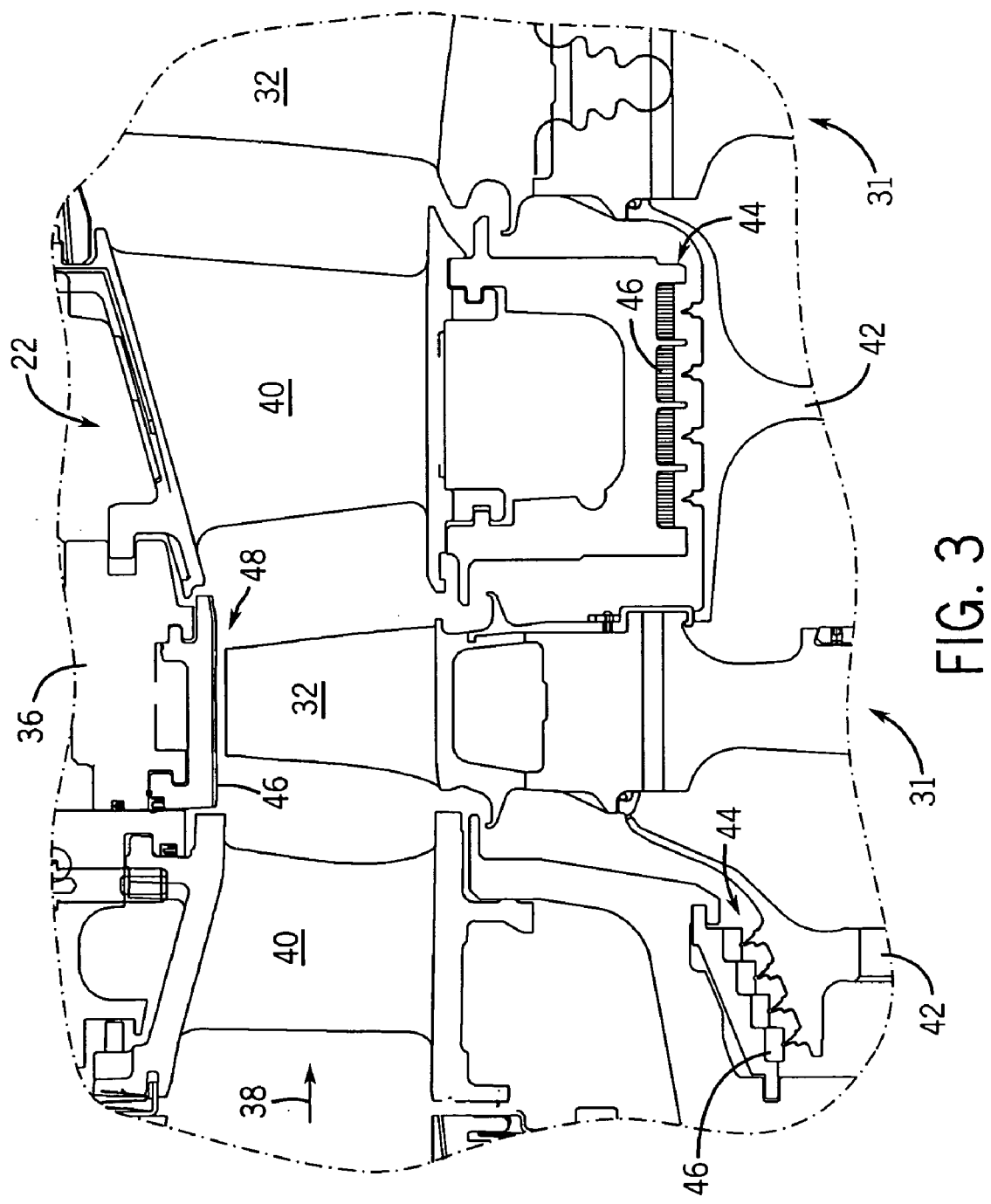
FIG. 3 is a detail view of a portion of the gas turbine engine of FIG. 2 showing embodiments of abradable seals.

FIG. 3 is a detail view of an embodiment of the turbine 22 taken within line 3-3 of FIG. 2. The hot combustion gases may flow from the combustor 29 (FIG. 1) into the turbine 22 in a direction 38, generally illustrated by an arrow. Stator vanes 40 may be located upstream of each stage 31 to direct the hot combustion gases towards the blades 32. The stator vanes 40 may be rigidly mounted to the turbine 22 and may interface with spacer disks 42 mounted to the shaft 26 (FIG. 1). Seal structures 44 may be located between the stator vanes 40 and the spacer disks 42 to reduce the leakage of hot combustion gases from the combustion flow path towards the shaft 26. The seal structures 44 may include abradable seals 46 designed to provide a tight tolerance between the stator vanes 40 and the spacer disks 42.

The hot combustion gases may flow through the stator vanes 40 to the blades 32. The combustion gases may apply motive forces to the blades 32 to turn the shaft 26 (FIG. 26). The blades 32 are surrounded by the shroud 36, which minimizes the quantity of combustion gases that bypass the blades 32. Specifically, a seal structure 48 may be located between the shroud 36 and the blades 32. The seal structure 48 may include an abradable seal 46, which provides a tight tolerance between the blades 32 and the shroud 36. Under certain operating conditions, the blades 32 may contact the abradable seal 46. To reduce wear of the blades 32, the abradable seal 46 may be designed to erode when contacted by the blades 32. The abradability also may allow a tight tolerance to exist between the seal structure 48 and the blades 32.

Figure 4:
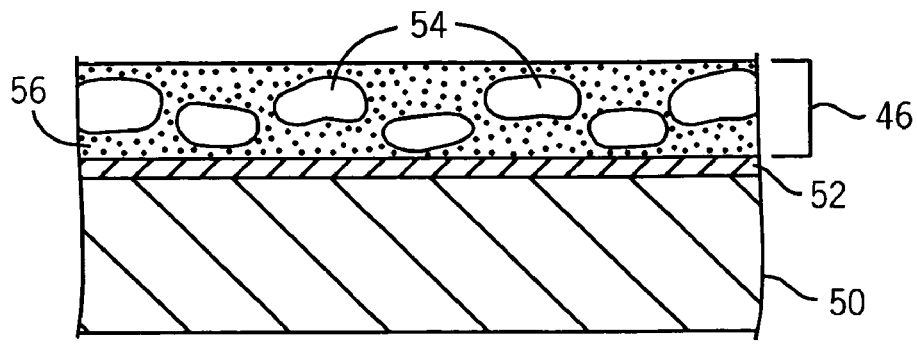
FIG. 4 is a cross-sectional view of an embodiment of an abradable seal.

FIG. 4 depicts a cross-sectional view of an embodiment of the abradable seal 46. The abradable seal 46 may be located in a seal between rotating and stationary parts of a rotary machine. For example, the abradable seal 46 may be included in the stator vane seal structures 44 (FIG. 3), in the shroud seal structures 48 (FIG. 3), or in combinations thereof as illustrated in FIG. 3. In other embodiments, the abradable seal 46 may be included between compressor blades and a shroud, or within other rotary seal locations in a steam turbine, rotary compressor, or generator, among others.

The abradable seal 46 may be located on a substrate 50, such as the shroud 36 or the stator vanes 40 shown in FIG. 3. In other embodiments, the substrate 50 may include a blade, casing, vane, or other component within a rotary machine, such as a steam turbine, gas turbine, rotary compressor, or generator. In certain embodiments, a bond material 52 may be applied to the substrate 50 to provide adherence and/or a transition from the composition of the substrate 50 to the composition of the abradable seal 46. In certain embodiments, the bond material 52 may be of the MCrAlY type. In general, the terminology "MCrAlY" refers to a variety of families of bond materials, where M refers to nickel, cobalt, iron, and combinations thereof. However, in other embodiments, the bond material 52 may be eliminated and the abradable seal 46 may be located directly on the substrate 50.

The abradable seal 46 may be thermally sprayed, dipped, or otherwise applied to the substrate 50 and/or the bond coat 52. In certain embodiments, the abradable seal 46 may include two phases of material pre-mixed together and then applied to the substrate 50 as one mixture. However, in other embodiments, each phase of material in the abradable seal 46 may be sprayed, or otherwise applied, to the substrate 50 a separate stream. The abradable seal 46 also may include a cast or sintered tile or brick mounted or otherwise affixed to the substrate 50 and/or the bond coat 52.

The abradable seal 46 may generally include a multi-phase composition of a relatively soft phase material 54 incorporated into a matrix of a relatively hard phase material 56. The hard phase material 56 may provide structural strength for the abradable seal 46 while the soft phase material 54 provides abradability. The hard and soft phase materials 56 and 54 may both include the same or similar base materials. However, the materials 54 and 56 may exist in different crystalline phases. For example, the soft phase material 54 may include fully stabilized zirconia, and the hard phase material 56 may include partially stabilized zirconia. Specifically, the fully stabilized zirconia may have a cubic crystal system and the partially stabilized zirconia may have a tetragonal crystal system or a combination of cubic and tetragonal crystal systems. In this example, the difference in crystal structures can be achieved by varying the amount and/or chemical composition of the stabilizer.

The soft phase material 54 and the hard phase material 56 may have different hardness properties due to different crystalline phases of the hard and soft phase materials 54 and 56. Different crystalline phases may include different crystal systems and/or lattice structures. For example, the hard phase material 56 may have one crystal system while the soft phase material 54 has a different crystal system. Any suitable combination of different crystal systems, such as cubic, tetragonal, monoclinic, hexagonal, rhombohedral, triclinic, or orthorhombic, may be employed in the hard and soft phase materials 56 and 54. In another example, the hard phase material 56 may have one lattice structure while the soft phase material 54 has another lattice structure. Any suitable combination of different lattice structures, such as simple, body centered, or face centered crystal structures, among others, may be employed in the hard and soft phase materials 56 and 54. Moreover, in certain embodiments, the hard phase material 56 and/or the soft phase material 54 may exist in an amorphous state. In one example, the hard phase material 56 may have a tetragonal crystal system while the soft phase material 54 may have a cubic crystal system. In another example, the hard phase material 56 may have a hexagonal crystal system while the soft phase material 54 may have an amorphous structure. Moreover, in certain embodiments, the soft phase material 54 and the hard phase material 56 may have different hardness properties due to different chemical compositions. In these embodiments, the soft phase material 54 and the hard phase material 56 may have the same or different crystalline phases.

Of course, the crystal systems are provided by way of example only, and are not intended to be limiting. Any combination of crystal systems may be employed that provides a stronger hard phase material 56 than the soft phase material 54. In general, the use of the same or similar base materials with different crystal systems and/or lattice structures for the soft phase and hard phase materials 54 and 56 may provide a more homogenous abradable seal 46 that may reduce the fluid permeability of the abradable seal 46, thereby improving operating efficiency of the rotary machine.

The relative hardness of the hard phase material 56 and the soft phase material 54 may vary by approximately 5-70 percent, and all subranges therebetween. The relative hardness may be measured using a Rockwell hardness test, Brinell hardness test, Mohs hardness test, or other macro, micro, or superficial hardness tests, among others. According to certain embodiments, the relative hardness between the hard phase material 56 and the soft phase material 54 may vary by approximately 5-70 percent as measured by the Rockwell hardness test using ASTM E18-08b. For example, the relative hardness may vary by approximately 5, 10, 15, 20, 25, 30, 35, 40, 45, 50, 55, 60, 65, or 70 percent as measured using ASTM E18-08b. More specifically, the relative hardness as measured using ASTM E18-08b may vary by approximately 20-60 percent, or even more specifically by approximately 30-50 percent.

The relative hardness of the hard phase material 56 and the soft phase material 54 also may be measured by solid particle erosion resistance using ASTM G76-07. According to exemplary embodiments, the hard phase material 56 may be approximately 1-10 times more resistant to solid particle erosion than the soft phase material 54. For example, the hard phase material may be approximately 1, 2, 3, 4, 5, 6, 7, 8, 9, or 10 times more resistant to solid particle erosion than the soft phase material 54. More specifically, the hard phase material 56 may be approximately 6-10 times more resistant to solid particle erosion than the soft phase material 54.

The hard and soft phases of materials 56 and 54 may be incorporated together into one structure to create a strong and substantially nonporous abradable seal 46. In certain embodiments, the soft phase material 54 may be suspended in a matrix of the hard phase material 56. In other embodiments, the two phases of materials 54 and 56 may be intertwined or commingled. The incorporation of a soft phase material 54 into a hard phase material 56 may provide abradability without the use of voids that may be created using a fugitive material, such as polyester. In other words, no voids may be intentionally introduced into the abradable seal 46. Of course, a relatively small amount of voids may exist within the abradable seal, for example, as an artifact from processing. According to exemplary embodiments, the abradable seal 46 may be substantially nonporous with a porosity of at least less than approximately 0-15 percent by volume, and all subranges therebetween. For example, the abradable seal 46 may have a porosity of at least less than 1, 2, 3, 4, 5, 6, 7, 8, 9, 10, 11, 12, 13, 14, or 15 percent by volume. Moreover, the abradable seal 46 may have an abradability of approximately 0-15 percent as measured by a rub test calculating the ratio of blade wear on a rotary blade to incursion depth in a stationary seal. More specifically, the abradable seal 46 may have an abradability of approximately 0-10 percent, or even more specifically approximately 0-5 percent as measured by a rub test.

To meet the performance requirements of a given application, the relative amounts of the soft phase material 54 and the hard phase material 56 may vary depending on factors such as the compositions of the materials 54 and 56, the rotary machine employing the abradable seal 46, and the location of the abradable seal 46 in the rotary machine, among others. Operating conditions of the seal, such as temperature, rate of incursion, tip speed, and depth of incursion also may determine the relative amounts of the soft phase material 54 and the hard phase material 56 desired to meet the performance requirements. In certain embodiments, the abradable seal 46 may include approximately 30-90 percent by volume of the soft phase material 54 and approximately 70-10 percent by volume of the hard phase material 56, and all subranges therebetween. For example, the ratio by volume of the soft phase material 54 to the hard phase material 56 may be approximately 50/50, 60/40, 70/30, 80/20, or 90/10, among others. More specifically, the abradable seal 46 may include approximately 65-90 percent by volume of the soft phase material 54 and approximately 35-10 percent by volume of the hard phase material 56.

2. Ceramic Abradable Seals

As noted above, the hard and soft phase materials 56 and 54 may both be constructed of the same base material, with the same base material existing in different crystalline phases in the hard and soft phase materials 56 and 54. For example, the base material may include a ceramic material, such as zirconia, alumina, or rare earth silicates such as yttrium monosilicate or yttrium disilicate, among others. In the soft phase material 54, the ceramic base material may be fully stabilized, while the same ceramic base material is partially stabilized in the hard phase material 56. Different amounts of an additive may be added as a stabilizer to the hard and soft phase materials 56 and 54 to provide different crystal phases between the hard and soft phase materials 56 and 54. According to certain embodiments, the stabilizers may include yttria, gadolinia, lanthana, magnesia, calcia, cerium (III) oxide, scandia, neodinium, ytterbia, titania, dysprosia, tantala, and combinations thereof, among others. In certain embodiments, the soft phase material 54 may include approximately 10-25 percent by weight of a stabilizer, and all subranges therebetween. More specifically, the soft phase material 54 may include approximately 12-20 percent by weight of a stabilizer. The hard phase material 56 may include approximately 2-10 percent by weight of a stabilizer, and all subranges therebetween. More specifically, the hard phase material 56 may include approximately 4-8 percent by weight of a stabilizer.

However, in other embodiments, the percentages of the stabilizer in the soft phase material 54 and/or the hard phase material 56 may vary within or outside of the given ranges depending on factors such as the stabilizer used, the soft phase material, the hard phase material, or the operating conditions, among others. Further, in certain embodiments, a stabilizer may not be included in one of the hard or soft phase materials 56 and 54. For example, the soft phase material 54 may include approximately 12-20 percent by weight of a stabilizer while the hard phase material 56 does not include the stabilizer. According to certain embodiments, the hard phase material 56 may include partially stabilized zirconia with a tetragonal crystal system and approximately 8 percent by weight of yttria as a stabilizer, while the soft phase material 54 may include fully stabilized zirconia with a cubic crystal system and approximately 20 percent by weight of yttria as a stabilizer.

In certain embodiments, the same stabilizer may be used in both the hard and soft phases 56 and 54. However, in other embodiments, different stabilizers may be used between the hard and soft phases 56 and 54. For example, the hard phase material 56 may include yttria as a stabilizer, while the soft phase material 54 includes ytterbia as a stabilizer. In another example, the hard phase material may include calcia as a stabilizer, while the soft phase material 54 includes magnesia as a stabilizer.

The hard and soft phase materials 56 and 54 also may be constructed of different base materials, with each of the hard and soft phase materials 56 and 54 existing in different crystalline phases. For example, the hard phase material 56 may include partially stabilized zirconia in a tetragonal phase as a base material, and the soft phase material 54 may include fully stabilized hafnia in a cubic phase as a base material. In another example, the hard phase material 56 may include silicon carbide as a base material, and the soft phase material 54 may include clay, such as kaolin or bentonite.

The following paragraphs provide specific compositions for the abradable seals 46. However, these specific compositions are provided by way of example only, and are not intended to be limiting. In a first example, the abradable seal 46 may include a soft phase material 54 and a hard phase material 56 both employing zirconia as a base material. The abradable seal 46 may include approximately 15-35 percent by weight of fully stabilized zirconia as the soft phase material 54 and approximately 65-85 percent partially stabilized zirconia as the hard phase material 56. The soft phase material 54 may include approximately 20 percent by weight of yttria as a stabilizer, and the hard phase material 56 may include approximately 8 percent by weight yttria as a stabilizer. As measured using ASTM G76-07, the soft phase material 54 may have a solid particle erosion resistance of approximately 3-10 seconds per mil, and all subranges therebetween, and the hard phase material 56 may have a solid particle erosion resistance of approximately 30-60 seconds per mil, and all subranges therebetween. The soft phase material 54 may have a hardness of approximately 80 Rockwell 15Y and the hard phase material 56 may have a Rockwell hardness of approximately 90 Rockwell 15Y. The abradable seal 46 may have a porosity of approximately 0-15 percent by volume as a processing artifact.

In a second example, the abradable seal 46 may include a soft phase material 54 and a hard phase material 56 both employing alumina as a base material. The abradable seal 46 may include approximately 30-50 percent of alpha+rutile phase alumina as the soft phase material 54 and approximately 50-70 percent by volume of alpha phase alumina as the hard phase material 56. In these embodiments, the soft phase material 54 may have a combination of hexagonal (from the alpha phase) and tetragonal (from the rutile phase) crystal systems, while the hard phase material 56 has a hexagonal crystal system. The soft phase material 54 may include approximately 13 percent by weight of titania as an additive, and the hard phase material 56 may not include any (e.g., approximately 0 percent by weight) titania as an additive. As measured using ASTM G76-07, the soft phase material 54 may have a solid particle erosion resistance of approximately 40 seconds per mil, and the hard phase material 56 may have a solid particle erosion resistance of approximately 60 seconds per mil. The soft phase material 54 may have a hardness of approximately 85 Rockwell 15N, and the hard phase material 56 may have a hardness of approximately 98 Rockwell 15N. The abradable seal 46 may have a porosity of approximately 0-15 percent by volume as a processing artifact.

3. Metallic Abradable Seals

The hard and soft phase materials 56 and 54 may both be metallic alloys with the same metallic element. In other words, the hard and soft phase materials 56 and 54 both may have the same metallic element as their base material. Different amounts of an additive may be added to each of the hard and soft phase materials 56 and 54 to form metallic alloys with different phases. The base material may include a metallic element or constituent, such as nickel, molybdenum, or iron, among others. The additive may include a metallic element, metalloid, or constituent thereof, such as aluminum, nickel, copper, silicon, titanium, lithium, and/or alloys thereof, among others. The additive also may include a non-metallic element or constituent, such as carbon or an aluminum matrix that includes alumina as a non-metallic element, among others. The different phases between the hard and soft phase materials 56 and 54 may be provided by different crystal systems or by different lattice structures within the same crystal system. For example, in certain embodiments, the soft phase material 54 may have a body centered cubic (BCC) crystal structure, while the hard phase material 56 has a face centered cubic (FCC) crystal structure.

Different amounts of the additive may be added to the hard and soft phase materials 56 and 54 to provide different crystal phases between the hard and soft phase materials 56 and 54. In certain embodiments, the soft phase material 54 may include approximately 1-35 percent by weight of an additive. According to exemplary embodiments, the soft phase material 54 may include a nickel alloy, such as Monel 411, containing approximately 32 percent copper and approximately 1.5 percent silicon as additives. The hard phase material 56 may include approximately 1-35 percent by weight of an additive. According to exemplary embodiments, the hard phase material 56 may include a nickel alloy, such as Monel 505, containing approximately 29 percent copper and approximately 4 percent silicon as additives.

In certain embodiments, the same additive may be used in both the hard and soft phases 56 and 54. However, in other embodiments, different additives may be used between the hard and soft phases 56 and 54. For example, the hard phase material 56 may include a nickel base material with aluminum as an additive while the soft phase material 54 includes a nickel base material with copper as an additive. In another example, the hard phase material 56 may include a molybdenum base material with carbon as an additive while the soft phase material 54 includes a molybdenum base material with silicon as an additive. According to exemplary embodiments, the hard phase material 56 may include carbon alloyed molybdenum while the soft phase material includes molybdenum disilicide ($MoSi_2$). In yet another example, the hard phase material 56 may include an aluminum base material with titanium or lithium as additives while the soft phase material 54 includes aluminum without any additives. In yet another example, the hard phase material 56 may include titanium as a base material with carbon as an additive while the soft phase material 54 includes silicon as an additive. According to exemplary embodiments, the hard phase material 56 may include carbon alloyed titanium while the soft phase material includes titanium silicide (TiSi).

The hard and soft phase materials 56 and 54 also may be constructed of similar base materials, with each of the hard and soft phase materials 56 and 54 existing in different crystal phases. As noted above, the different crystal phases may include different crystal systems or different lattice structures within the same crystal system. For example, the hard phase material 56 may include martensitic steel, and the soft phase material 54 may include austenitic steel. In another example, the hard phase material 56 may include orthorhombic aluminum boride ($AlB_{10}$), and the soft phase material 54 may include hexagonal aluminum diboride ($AlB_2$). In yet another example, the hard phase material 56 may include cubic boron nitride (BN), and the soft phase material 54 may include hexagonal boron nitride (BN).

The following paragraph provides a specific composition of a metallic abradable seal structure 46. However, this specific composition is provided by way of example only, and is not intended to be limiting. In this example, the abradable seal 46 may include a soft phase material 54 and a hard phase material 56 both employing nickel as a base material. The abradable seal 46 may include approximately 25-75 percent by weight of $Ni_{20}Al$ as the soft phase material 54 and approximately 75-25 percent by weight of $Ni_5Al$ as the hard phase material 56. For example, the ratio by weight of the soft phase material 54 to the hard phase material 56 may be approximately 25/75, 35/65, 45/55, 50/50, 55/45, 65/35, or 75/25, among others. The soft phase material 54 may include approximately 31.7 percent by weight of the additive aluminum, and the hard phase material 56 may include approximately 5 percent by weight of the additive aluminum. The soft phase 54 may have a hardness of approximately 30-60 Rockwell 15Y and the hard phase 56 may have a hardness of approximately 40-80 Rockwell 15Y. The abradable seal 46 may have a porosity of approximately 0-5 percent by volume as a processing artifact.

4. Multiple Layers

Figure 5:
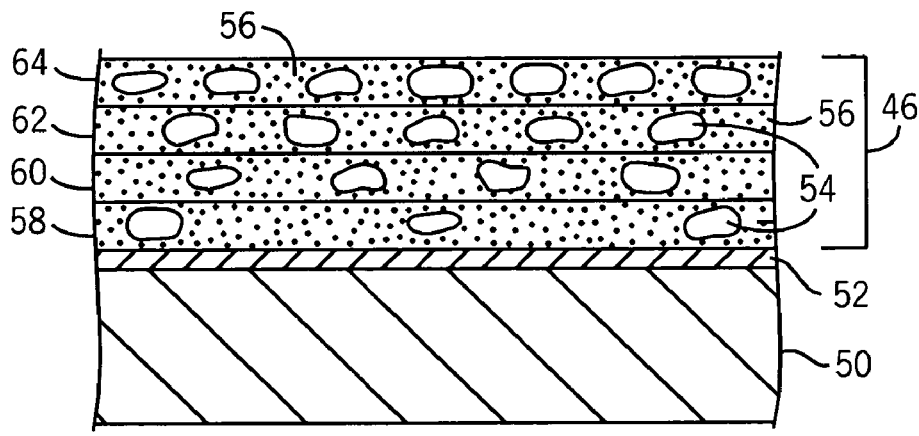
FIG. 5 is a cross-sectional view of another embodiment of an abradable seal with multiple layers.

FIG. 5 depicts an embodiment of an abradable seal 46 that includes multiple layers 58, 60, 62, and 64. Each layer 58, 60, 62, and 64 may include a soft phase material 54 incorporated into a matrix of a hard phase material 56. The first layer 58 may be located on the substrate 50 or on an optional bond coat 52. The hard and soft phase materials 56 and 54 may include any of the materials discussed above with respect to FIG. 4. Further, the hard and soft phase materials 56 and 54 may be the same or may vary between the layers 58, 60, 62, and 64. In certain embodiments, each layer 58, 60, 62, and 64 may include ceramic abradable seals, while in other embodiments; each layer 58, 60, 62, and 64 may include metallic abradable seals.

In general, the hardness may decrease progressively from the inner layer 58 towards the outer layer 64. For example, the first and inner layer 58 may have a hardness ranging from approximately 70-90 Rockwell 15Y; the second layer 60 may have a hardness ranging from approximately 50-80 Rockwell 15Y; the third layer 62 may have a hardness ranging from approximately 40-70 Rockwell 15Y; and the fourth and outer layer 64 may have a hardness ranging from approximately 30-70 Rockwell 15Y.

The amount of the soft phase material 54 in each layer may increase progressively from the inner layer 58 towards the outer layer 64. For example, the first layer 58 may include approximately 0-20 percent of the soft phase material 54 by volume; the second layer 60 may include approximately 10-40 percent of the soft phase material 54 by volume; the third layer 62 may include approximately 30-70 percent of the soft phase material 54 by volume; and the fourth layer 64 may include approximately 50-90 percent of the soft phase material 54 by volume. In certain embodiments, the amount by volume of the soft phase material 54 may vary from one layer to another by approximately 5, 10, 15, 20, 30, 40, 50, or 60 percent.

In a first specific example, each of the layers 58, 60, 62, and 64 may include fully stabilized zirconia as the soft phase material 54 incorporated into a matrix of partially stabilized zirconia as the hard phase material 56. Specifically, the soft phase material 54 may include fully stabilized zirconia with approximately 20 percent by weight yttria as an additive, and the hard phase material 56 may include partially stabilized zirconia with approximately 8 percent by weight yttria as an additive. In these embodiments, the fully stabilized zirconia may have a monoclinic crystal system while the partially stabilized zirconia has a tetragonal crystal system. The first layer 58 may include approximately 0-20 percent by volume of fully stabilized zirconia as the soft phase material 54 incorporated into a matrix of partially stabilized zirconia as the hard phase material 56. The second layer 60 may include approximately 10-40 percent by volume of fully stabilized zirconia as the soft phase material 54 incorporated into a matrix of partially stabilized zirconia as the hard phase material 56. The third layer 62 may include approximately 30-70 percent by volume of fully stabilized zirconia as the soft phase material 54 incorporated into a matrix of partially stabilized zirconia as the hard phase material 56. The fourth layer 64 may include approximately 50-90 percent by volume of fully stabilized zirconia as the soft phase material 54 incorporated into a matrix of partially stabilized zirconia as the hard phase material 56.

In a second specific example, each of the layers 58, 60, 62, and 64 also may include fully stabilized zirconia as the soft phase material 54 incorporated into a matrix of partially stabilized zirconia as the hard phase material 56. However, in this example, the soft phase material 54 may include fully stabilized zirconia with approximately 14 percent by weight dysprosium as an additive, and the hard phase material 56 may include partially stabilized zirconia with approximately 8 percent by weight yttria as an additive. The first layer 58 may include approximately 0-20 percent by volume of fully stabilized zirconia as the soft phase material 54 incorporated into a matrix of partially stabilized zirconia as the hard phase material 56. The second layer 60 may include approximately 10-40 percent by volume of fully stabilized zirconia as the soft phase material 54 incorporated into a matrix of partially stabilized zirconia as the hard phase material 56. The third layer 62 may include approximately 30-70 percent by volume of fully stabilized zirconia as the soft phase material 54 incorporated into a matrix of partially stabilized zirconia as the hard phase material 56. The fourth layer 64 may include approximately 50-90 percent by volume of fully stabilized zirconia as the soft phase material 54 incorporated into a matrix of partially stabilized zirconia as the hard phase material 56.

Of course, the above examples are not intended to be limiting. Any suitable combination of hard and soft phase materials 56 and 54 may be employed in the layers 58, 60, 62, and 64, and in certain embodiments, the compositions of the hard and soft phase materials 56 and 54 may vary between the layers 58, 60, 62, and 64. Further, although four layers are shown in FIG. 5, the number of layers may vary. For example, the abradable seal 46 may employ approximately 1, 2, 3, 4, 5, 6, 7, 8, 9, 10, or more layers. The thickness of each layer 58, 60, 62, and 64 also may vary. For example, each layer 58, 60, 62, and 64 may have a thickness ranging from approximately 0.25-1.5 mm (1-60 mils), and all subranges therebetween. More specifically, each layer 58, 60, 62, and 64 may have a thickness ranging from approximately 0.025-0.5 mm (1-20 mils).

Figure 6:
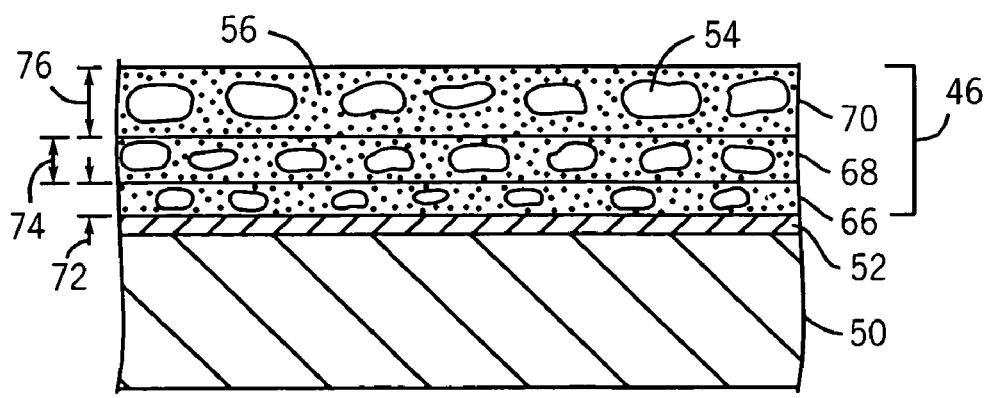
FIG. 6 is a cross-sectional view of another embodiment of an abradable seal with layers of varying thicknesses.

The thickness of the layers also may vary between the layers. FIG. 6 depicts an embodiment of the abradable seal 46 with layers 66, 68, and 70 of varying thicknesses 72, 74, and 76. Each layer 66, 68, and 70 may include a soft phase material 54 incorporated into a matrix of a hard phase material 56, as described above with respect to FIGS. 4 and 5. The thickness 72, 74, and 76 may generally increase from the first and inner layer 66 towards the third and outer layer 70. For example, the first layer 66 may have a thickness 72 ranging from approximately 0.025-0.5 mm (1-20 mils). The second layer 68 may have a thickness 72 ranging from approximately 0.13-1.02 mm (5-40 mils). The third layer 70 may have a thickness 72 ranging from approximately 0.254-1.5 mm (10-60 mils). However, in other embodiments, the layers 66, 68, and 70 may decrease in thickness away from the substrate 50. Further, in certain embodiments, the middle layer 68 may be thicker or thinner than the adjacent layers 70 and 66. Regardless of the type of thickness variation, the relative thickness between layers may vary by at least approximately 5, 10, 15, 20, 25, 30, 35, 40, 45, 50, 55, 60, 65, 70, 75, 80, 85, 90, 95, or 100 percent.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
    a seal disposed between moving and stationary components, wherein the seal comprises:
        a multi-phase composition, comprising:
            a matrix comprising a first material having a first crystalline phase of a base material; and
            a second material having a second crystalline phase of the base material suspended in the matrix, wherein the first and second crystalline phases are different from one another.

2. The system of claim 1, wherein the first material has a hardness greater than the second material.

3. The system of claim 1, wherein the first material has a greater solid particle erosion resistance than the second material.

4. The system of claim 1, wherein the multi-phase composition has a porosity less than approximately 15 percent by volume.

5. The system of claim 1, wherein the base material comprises a ceramic, the first material comprises the ceramic and a first stabilizer, and the second material comprises the ceramic and a second stabilizer different from the first stabilizer.

6. The system of claim 1, wherein the base material comprises a ceramic, the first material comprises the ceramic having a first percentage of a stabilizer, and the second material comprises the ceramic having a second percentage of the stabilizer different from the first percentage.

7. The system of claim 5, wherein the ceramic comprises zirconia, hafnia, or combinations thereof, and the stabilizer comprises yttria, magnesia, calcia, dysprosia, gadolinia, tantala, ytterbia, titania, or combinations thereof.

8. The system of claim 1, wherein the base material comprises a metal, the first material comprises the metal having a first percentage of an additive, and the second material comprises the metal having a second percentage of the additive different from the first percentage.

9. The system of claim 8, wherein the metal comprises nickel, molybdenum, or iron and the additive comprises aluminum, silicon, or carbon.

10. The system of claim 1, comprising a turbine engine with the seal disposed between rotary blades and a shroud of the turbine engine.

11. A system, comprising:
    an abradable, substantially non-porous seal, comprising:
        a ceramic matrix composition, comprising:
            a hard ceramic having a first crystalline phase of a base ceramic with a first percentage of a stabilizer; and
            a soft ceramic having a second crystalline phase of the base ceramic with a second percentage of the stabilizer, wherein the first and second percentages are different from one another.

12. The system of claim 11, wherein the first and second crystalline phases comprise different crystal systems.

13. The system of claim 12, wherein the first crystalline phase comprises a tetragonal crystal system and the second crystalline phase comprises a cubic crystal system.

14. The system of claim 11, wherein at least one of the first or second crystalline phases is amorphous.

15. The system of claim 11, wherein the hard ceramic comprises partially stabilized zirconia, and wherein the soft ceramic comprises fully stabilized zirconia.

16. The system of claim 15, wherein the stabilizer comprises yttria, the first percentage comprises approximately 8 percent, and the second percentage comprises approximately 20 percent.

17. The system of claim 11, wherein the hard ceramic has a hardness at least approximately 5 percent greater than the soft ceramic, and the hard ceramic has a solid particle erosion resistance at least approximately 6 times greater than the soft ceramic.

18. The system of claim 11, wherein the abradable, substantially non-porous seal comprises multiple layers each having different percentages of the soft ceramic and the hard ceramic.

19. The system of claim 11, comprising a substrate containing at least one layer of the abradable, substantially non-porous seal, wherein the abradable, substantially non-porous seal comprises a sprayed layer or a sintered tile.

* * * * *